(12) United States Patent
Jeong

(10) Patent No.: US 7,133,450 B2
(45) Date of Patent: Nov. 7, 2006

(54) METHOD AND DEVICES FOR DIGITAL VIDEO SIGNAL COMPRESSION AND MULTI-SCREEN PROCESS BY MULTI-THREAD SCALING

(75) Inventor: Cha-Gyun Jeong, Soowon-si (KR)

(73) Assignee: Posdata Company Ltd., Kyonggi-Do (KR)

( * ) Notice: Subject to any disclaimer, the term of this patent is extended or adjusted under 35 U.S.C. 154(b) by 701 days.

(21) Appl. No.: 10/031,593

(22) PCT Filed: Feb. 19, 2001

(86) PCT No.: PCT/KR01/00246

§ 371 (c)(1),
(2), (4) Date: Jan. 23, 2002

(87) PCT Pub. No.: WO01/95618

PCT Pub. Date: Dec. 13, 2001

(65) Prior Publication Data

US 2003/0007564 A1    Jan. 9, 2003

(30) Foreign Application Priority Data

Jun. 9, 2000  (KR)  ............................... 2000-31825

(51) Int. Cl.
*H04N 7/12*    (2006.01)
*H04N 11/02*   (2006.01)
*H03M 1/12*    (2006.01)

(52) U.S. Cl. .................. 375/240.11; 348/572
(58) Field of Classification Search ................ 348/159, 348/563, 564, 581, 588, 572; 375/240.01, 375/240.11; 345/660
See application file for complete search history.

(56) References Cited

U.S. PATENT DOCUMENTS

| | | | | | |
|---|---|---|---|---|---|
| 5,185,819 | A | * | 2/1993 | Ng et al. ..................... | 382/234 |
| 5,625,410 | A | * | 4/1997 | Washino et al. ............. | 348/154 |
| 5,648,792 | A | * | 7/1997 | Sato et al. .................... | 345/92 |
| 5,881,205 | A | * | 3/1999 | Andrew et al. .............. | 386/129 |
| 6,069,662 | A | * | 5/2000 | Horiuchi et al. ............. | 348/446 |
| 6,219,030 | B1 | * | 4/2001 | Nonomura et al. ......... | 345/603 |

FOREIGN PATENT DOCUMENTS

| | | |
|---|---|---|
| EP | 0 955 609 A1 | 11/1999 |
| JP | 8205030 | 8/1996 |
| JP | 11069302 | 3/1999 |
| KR | 1999-017337 | 7/1999 |

* cited by examiner

*Primary Examiner*—Gims Philippe
*Assistant Examiner*—Erick Rekstad
(74) *Attorney, Agent, or Firm*—Dickstein Shapiro LLP

(57) ABSTRACT

The present invention relates to methods and devices for compression and multi-screen process of digital video signals by multi-thread scaling. The method comprises. (a) a step to scale the resolutions of digital video signals; and (b) a step to compress or process for multi-screens the scaled digital video signals. The device comprises: multi-channel analog/digital converters, a compression FIFO; a multi-screen FIFO; a CPU which initializes each channel's analog/digital converter, and a video processor which transmits to the video memory. The processor for compression/multi-screen process may conduct the compression and multi-screen process sequentially from the compression FIFO and the multi-screen FIFO depending on the even/odd fields of the signals Thus, the method and device uses N analog/digital converters for the same N channels while providing the same function as the conventional system.

15 Claims, 4 Drawing Sheets

METHOD AND DEVICES FOR DIGITAL VIDEO SIGNAL COMPRESSION AND MULTI-SCREEN PROCESS BY MULTI-THREAD SCALING

TECHNICAL FIELD

The present invention relates to the method and device for digital video signal compression/multi-screen process by multi-thread scaling.

BACKGROUND ART

Compression/multi-screen process of digital video signals may be used in a digital video recorder (DVR) which converts analog images into digital images and records/stores such images, or displays such images real time.

Ordinarily, a DVR must compress and record multi-channel video signals inputted from a number of cameras, and must display such signals on multi-screens.

Among various modules constituting such DVR system, the compression unit and the multi-screen processor are the most important modules. In the conventional multi-channel DVR systems, such compression units and multi-screen processors are set apart as independent modules.

The multi-thread scaling means to process screens of different resolutions alternating the even field and the odd field of interlacing.

FIG. 1 is a diagram illustrating a conventional DVR system with an independent compression unit and an independent multi-screen processor.

Operations of the compression unit (10) illustrated in FIG. 1 are explained herein below. First of all, the central processing unit ("CPU") (13) initializes the analog/digital converters (11), and the compression FIFO (12) in the pre-determined order. Such initialized analog/digital converters (11) store digital data in the compression FIFO (12) and issues to the CPU (13) an interrupt exception handling request. Although the CPU (13) may fetch video data after polling the analog/digital converters (11), the compression FIFO (12) is used in order to decrease the load on the CPU (13), to increase the video data transmission efficiency, and to reduce transmission errors. The CPU (13)'s exception handling routine transmits video data from the compression FIFO (12) to the memory (RAM) (30) by a direct memory access method, encodes such data using compression algorithms such as MPEG, JPEG, and H.26x, etc., and then stores the data in a storage such as a hard disk.

The multi-screen processor (20) as illustrated in FIG. 1 operates as follows. In the multi-screen processor, the video processor (23) transmits digitalized video data from the multi-screen FIFO (22) to the video memory (31) according to the pre-determined rules set for the multi-screen processing. Then, such data are processed to constitute multi-screens, such as 4/8/16 screens, on a TV or a VGA monitor.

As explained above, the conventional system has independent modules for the compression unit (10) and the multi-screen processor (20) because the compression unit (10) and the multi-screen processor (20) are programmed to process video data in different resolutions. In other words, the compression unit (10) may process video data real time only if it is programmed to be a 30 frame transmission mode at the resolution of 352×240. Also, the multi-screen processor (2) for 16 screens, for example, may process video data real time only if it is programmed to be a 30 frame transmission mode at the resolution of 180×120. Therefore, the conventional N-channel real time DVR with independent compression unit (10) and multi-screen processor (20) requires 2×N analog/digital converters.

However, ordinary analog/digital converters consume an extraordinary amount of the current, which causes great consumption of electric power. Accordingly, they generate a significant amount of heat impairing stability of the system. Furthermore, conventional multi-channel DVR systems are expensive because (N channel)×2 analog/digital converters are required.

DISCLOSURE OF THE INVENTION

The present invention has a purpose to, by using the multi-thread scaling to process screens of different resolutions alternately in the even field and the odd field of interlacing, provide the method and device for digital video signal compression/multi-screen process only with N analog/digital converters, which method and device integrates the conventional compression unit and multi-screen processor requiring 2×N analog/digital converters.

In order to accomplish the above-mentioned purpose, the present invention's method to compress and process for multi-screens digital video signals by multi-thread scaling uses a single integrated analog/digital converter for each channel for compression/multi-screen process. The present invention's method comprises: (a) a step to scale the resolutions of digital video signals outputted from analog/digital converters depending on the even/odd fields of the inputted video signals; and (b) a step to compress or process for multi-screens the scaled digital video signals according to the resolutions scaled in the said step (a). The present invention's device for compression and multi-screen process of digital video signals by multi-thread scaling comprises: multi-channel analog/digital converters, which generate even/odd field indicators depending on the fields of the inputted multi-channel video signals and scale the resolution of each channel's video signals for compression or for multi-screen process while converting such signals into digital signals according to the even/odd fields of the signals; a compression FIFO which stores, for compression, the video signals outputted from each channel's analog/digital converter based upon the even/odd field indicator of such analog/digital converter; a multi-screen FIFO which stores, for multi-screen process, the video signals outputted from each channel's analog/digital converter based upon the even/odd field indicator of such analog/digital converter; a CPU which initializes each channel's analog/digital converter, the compression FIFO, and the multi-screen FIFO, and controls each channel's analog/digital converter so that the converted digital video signals may be scaled into various resolutions depending on the fields of the inputted multi-screen video signals; and a video processor which transmits the video signals which were inputted to the said multi-screen FIFO to the video memory according to the rules pre-determined for the multi-screen process.

BRIEF DESCRIPTION OF THE DRAWINGS

The invention will further be described by way of example and with reference to the following drawings, in which.

Detailed explanations of a preferred embodiment of the method and device for digital video signal compression/multi-screen process by multi-thread scaling are provided in the following with reference to the attached drawings.

BEST MODE FOR CARRYING OUT THE INVENTION

Figure 1:
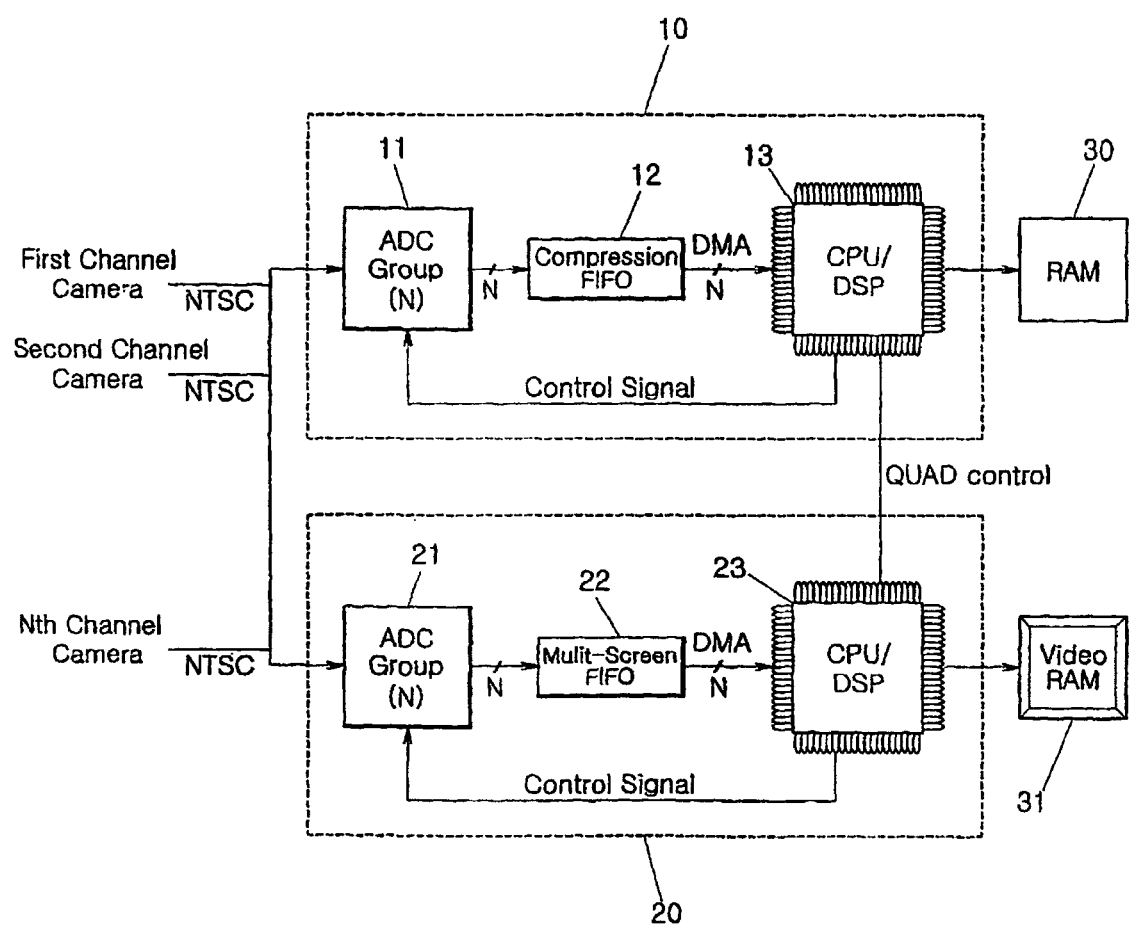
FIG. 1 is a diagram illustrating a conventional DVR system with an independent compression unit and an independent multi-screen processor.
Figure 2:
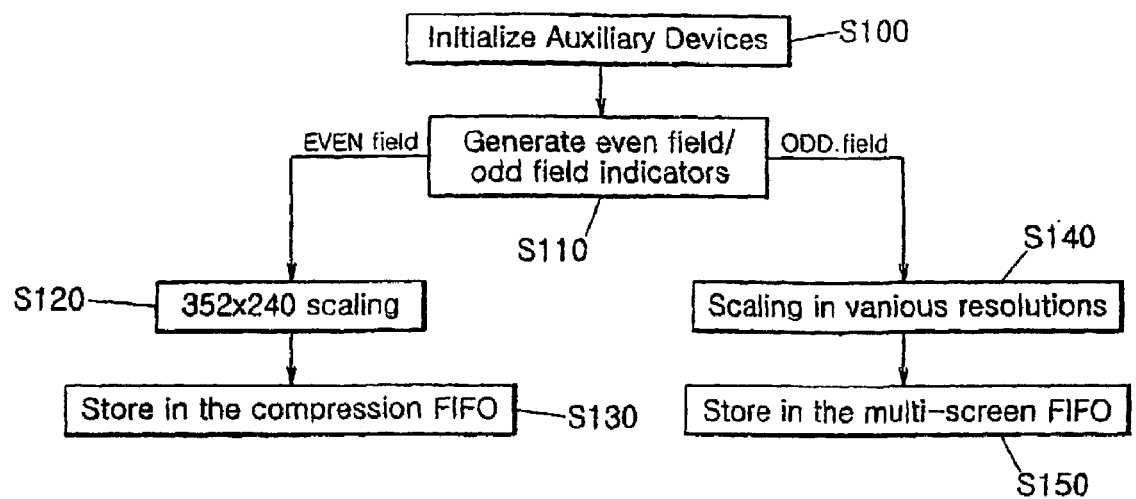
FIG. 2 is a flow chart for the compression/multi-screen process method for N channel digital video signals using N analog/digital converters according to the present invention.

FIG. 2 is a flow chart for the compression/multi-screen process method for N channel digital video signals using N analog/digital converters according to the present invention.

The initialization of auxiliary devices (S100) is a step in which the CPU initializes each channel's analog/digital converter, the compression FIFO, and the multi-screen FIFO.

Figure 4:
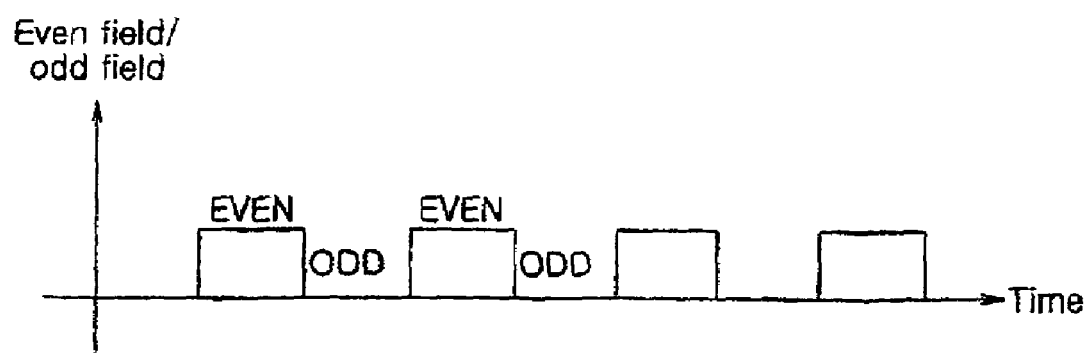
FIG. 4 is a diagram illustrating the operation principle of the multi-thread scaling of the present invention's method and device.

The generation of even field/odd field indicators (S110) is a step in which the initialized analog/digital converter of each channel generates even field/odd field indicators. FIG. 4 illustrates such generated even field/odd field indicators corresponding to time indicated on the time axis.

If the generated even field/odd field indicator is even, the 352×240 scaling (S120) is a step in which outputs digitalized video signals scaled to 352×240, and the said outputted digital video signals are transmitted to the compression FIFO (S130).

If the generated even field/odd field indicator is odd, digitalized video signals scaled to 180×120 for 16 screens, to 240×160 for 9 screens, or to 360×240 for 4 screens, are outputted (S140), and the outputted digital video signals are transmitted to the multi-screen FIFO (S150). At the step S140, the CPU is programmed to control the operation register of each channel's analog/digital converter so that the video signals may be scaled to 180×120 for 16 screens, to 240×160 for 9 screens, or to 360×240 for 4 screens in the event that the field indicator is odd.

Figure 3:
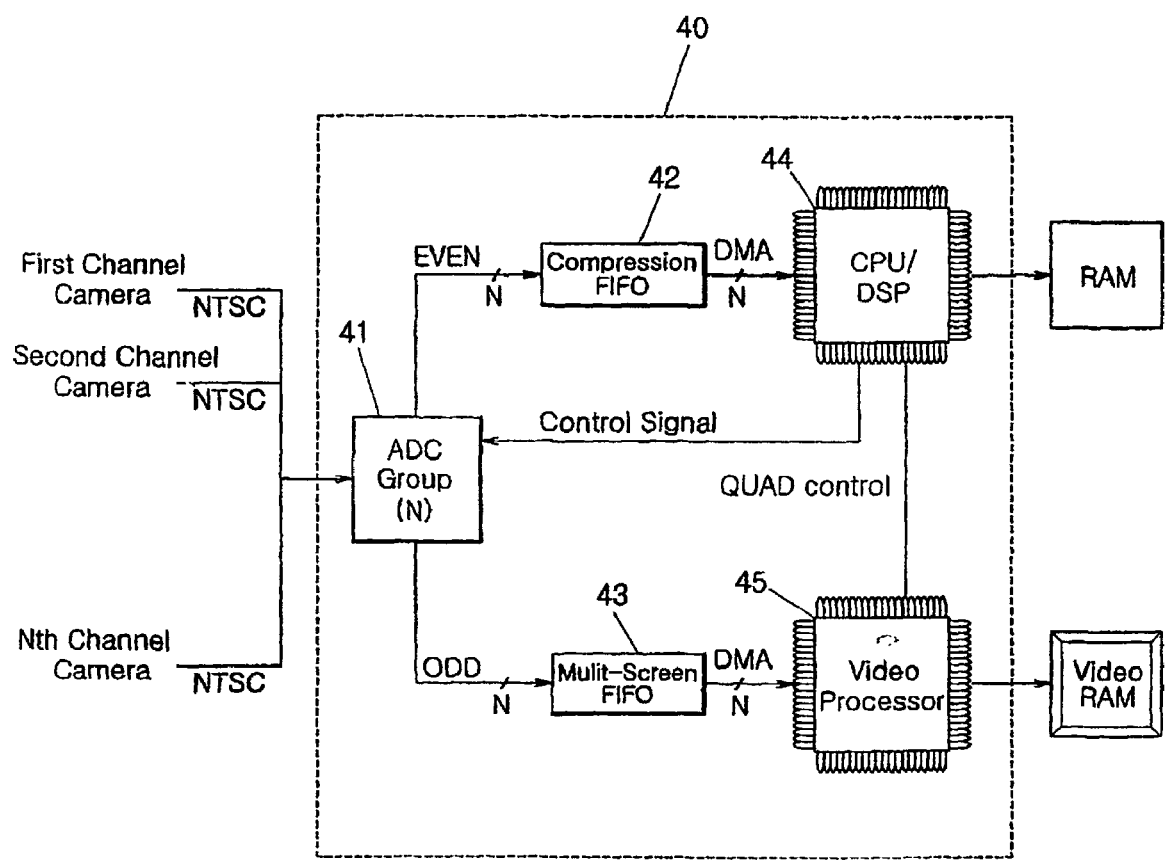
FIG. 3 is a diagram illustrating, as a preferred embodiment of the present invention, the device for digital video signal compression/multi-screen process integrating the compression unit and the multi-screen processor.

FIG. 3 is a diagram illustrating, as a preferred embodiment of the present invention, the device for digital video signal compression/multi-screen process in an N-channel DVR system with N analog/digital converters.

As illustrated in FIG. 3, the device has an integrated compression/multi-screen processor (40). In the following, compression of the inputted analog video signals in the even field and multi-screen process, for 4/9/16 multi-screens, of the inputted signals in the odd field are explained.

N analog/digital converters (41), after being initialized by the CPU (44), generate even field/odd field indicators, digitalize each channel's video signals and scale them to the resolutions of 180×120 for 16 screens, 240×160 for 9 screens, 360×240 for 4 screens, or 352×240 for the normal screen. If the even field/odd field indicator is even, the digitalized video signals, which have been scaled to the resolution of 352×240, are stored in the compression FIFO (42). If the even field/odd field indicator is odd, the digitalized video signals, which have been scaled to the resolutions of 180×120 for 16 screens, 240×160 for 9 screens or 360×240 for 4 screens, are stored in the multi-screen FIFO (43).

The compression FIFO (42) stores the video signals outputted from each channel's analog/digital converter (41) if the even field/odd field indicator is even. Although the CPU (44) may fetch digitalized video signals after polling the said analog/digital converter group (41), the present invention uses the compression FIFO (42) in order to reduce the load on the CPU (44), to raise the transmission efficiency of video signals, and to reduce transmission errors.

The multi-screen FIFO (43) stores the scaled video signals outputted from each channel's analog/digital converter if the even field/odd field indicator is odd.

The CPU (44) initializes the analog/digital converter (41) of each channel, the compression FIFO and the multi-screen FIFO. Furthermore, the CPU (44) controls the said analog/digital converters (41) so that the digitalized video signals may be scaled to various resolutions according to the even field/odd field indicators generated at each channel's analog/digital converter. The CPU (44) is programmed to control the operation register of each channel's analog/digital converter (41) so that the video signals may be scaled to the resolutions of 180×120 for 16 screens, 240×160 for 9 screens, or 360×240 for 4 screens in the event that the field indicator is odd.

The video processor (45) transmits the video signals which have been inputted to the multi-screen FIFO to the video memory in accordance with the rules pre-determined for the multi-screen process.

FIG. 4 is a diagram illustrating the operation principle of the multi-thread scaling of the present invention.

FIG. 4 illustrates even field/odd field indicators generated by each channel's analog/digital converter corresponding to the time represented at the time axis. Based upon such even field/odd field indicators, the CPU (44) controls the operation registers of the analog/digital converters (41) of each channel.

As explained in the foregoing, according to the present invention's method and device for digital video signal compression and multi-screen process by multi-thread scaling, the processor for compression/multi-screen process may conduct the compression and multi-screen process sequentially from the compression FIFO and the multi-screen FIFO depending on the even/odd fields of the signals. Thus, compared with the conventional multi-channel DVR system which uses 2*N analog/digital converters for N channels, the present invention's method and device uses N analog/digital converters for the same N channels while providing the same function as the conventional system.

The present invention enables the relevant system to be operated by half as many as conventionally needed converters in the related art field. Thus, the present invention saves 50% of the electricity and expense required for the conventional system. In addition to the effect of saving the electricity consumed for the system, the present invention also increases the stability of the multi-channel DVR system by reducing the number of required analog/digital converters by half.

What is claimed is:

1. A method of compressing and processing for multi-screens a plurality of digital video signals on respective channels by multi-thread scaling, which uses a single integrated analog/digital converter for each channel, said method comprising:
   (a) outputting scaled digital video signals from analog/digital converters having a first resolution for compression or having a second resolution for a multi-screen process depending on even/odd fields of input video signals; and (b) storing and compressing the scaled digital video signals of the first resolution, or storing and processing for multi-screens the scaled digital video signals of the second resolution.

2. The method of claim 1, wherein:
at said step (a), the video signals are scaled to have a resolution for compression in the even field.

3. The method of claim 2, wherein:
the first resolution for compression is 352×240.

4. The method of claim 2, wherein:
at said step (a), the video signals are scaled to have the second resolution for a multi-screen process in the odd field.

5. The method of claim 4, wherein:
the multi-screen process is the process for one of 4 screens, 9 screens and 16 screens.

6. The method of claim 5, wherein:
the second resolution for 4 screens is 360×240;
the second resolution for 9 screens is 240×160; and
the second resolution for 16 screens is 180×120.

7. A device for compression and multi-screen processing of digital video signals by multi-thread scaling comprising:
multi-channel analog/digital converters for receiving input video signals, for generating even/odd field indicators based on input video signal, and for converting the input video signals to digital video signals and scaling the digital video signals to have a first resolution for compression or to have a second resolution for a multi-screen process based on the even/odd field indicators, without storing the input video signals;
a compression FIFO for storing video signals scaled to have the first resolution outputted from the multi-channel analog/digital converters;
a multi-screen FIFO for storing video signals scaled to have the second resolution outputted from the multi-channel analog/digital converters;
a CPU for initializing the multi-channel analog/digital converters, the compression FIFO, and the multi-screen FIFO, and for compressing the video signals stored in the compression FIFO; and
a video processor for processing and transmitting an output of the multi-screen FIFO to the video memory according to a pre-determined rule for the multi-screen process,
wherein the multi-channel analog/digital converters, the compression FIFO, the multi-screen FIFO, the CPU and the video processor are integrated on a single board.

8. The device of claim 7, wherein the first resolution is 352×240, if the field indicator is even; and
the second resolution is one of 180×120 for 16 screens, 240×160 for 9 screens, and 360×240 for 4 screens, if the field indicator is odd.

9. The device of claim 7, wherein:
said CPU is programmed to control the operation registers of the analog/digital converters so that the video signals may be scaled to have the resolution of one of 180×120 for 16 screens, 240×160 for 9 screens, and 360×240 for 4 screens in the event that the field indicator is odd.

10. A method of compressing and processing digital video signals on respective channels by multi-thread scaling comprising the steps of:
receiving input video signals;
converting the input video signals to digital signals within a plurality of integrated analog/digital converters, each analog/digital converter corresponding to a channel;
generating an indicator signal indicating whether the field corresponding to each of the input video signals is a first type field or a second type field, wherein the generating occurs within the respective analog/digital converters;
scaling the digital signals having a first type field indicator signal to have a first resolution for compression and scaling the digital signals having a second type field indicator signal to have a second resolution for multi-screen processing, wherein the scaling of each digital signal occurs within the respective analog/digital converters;
storing the scaled digital signals for compression in at least one compression FIFO, and storing the scaled digital signals for multi-screen processing in at least one multi-screen FIFO;
compressing an output of the compression FIFO; and
processing an output of the multi-screen FIFO according to a pre-determined rule for the multi-screen processing.

11. The method of claim 10, wherein the first type field is an even field, and the second type field is an odd field.

12. The method of claim 10, wherein the first type field is an odd field, and the second type field is an even field.

13. The method of claim 10, wherein the first resolution is 352×240; and the second resolution is one of 360×240, 240×160, and 180×120.

14. A method of compressing and processing for multi-screens a digital video signal on a channel by multi-thread scaling, which uses a single integrated analog/digital converter, said method comprising:
(a) outputting a scaled digital video signal from the analog/digital converter having a first resolution for compression or having a second resolution for a multi-screen process depending on the even/odd fields of the input video signal; and
(b) storing and compressing the scaled digital video signal of the first resolution, or storing and processing for multi-screens the scaled digital video signal of the second resolution.

15. The device of claim 7, wherein the device for compression and multi-screen processing of digital video signals by multi-thread scaling is a non-PC based device.

* * * * *